Patented Apr. 25, 1944

2,347,462

UNITED STATES PATENT OFFICE 2,347,462

REFINING AND STABILIZING FAT-SOLUBLE VITAMIN - CONTAINING FATTY MATERIALS

Loran O. Buxton, Belleville, N. J., assignor to National Oil Products Company, Harrison, N. J., a corporation of New Jersey No Drawing. Application August 14, 1941, Serial No. 406,832

8 Claims. (Cl. 167—81)

This invention relates to refining and stabilizing fat-soluble vitamin-containing fatty materials, particularly vitamin-containing fish oils and concentrates thereof.

As is well known, fish liver oils and certain fish body oils are excellent sources of both vitamins A and D; moreover, saponification of these oils and extraction of the unsaponifiable material therefrom yields fat-soluble vitamin-containing concentrates which have found a wide variety of uses. However, while such vitamin-containing materials are eminently satisfactory for many purposes, they generally possess the undesirable taste and odor normally associated with products of fish origin, and in addition are usually less stable towards deteriorative oxidative changes than the crude oils from which they are derived. Fat-soluble vitamin-containing materials derived from sources other than of a fish origin may also possess objectionable tastes and odors. Many attempts have been made in an endeavor to improve the taste and odor of fat-soluble vitamin-containing materials objectionable in these respects. In many cases, however, any improvement that is obtained is not nearly as great as desired, and also in some cases is only temporary; furthermore, such treatments frequently have detrimental effects on the stability of the fatty material in regard to future deteriorative oxidative changes therein. For example, an alkali refining method has been employed for improving the tastes and odors of fish liver oils; in this method an alkali soap is prepared in the presence of the oil and then removed, the soap tending to carry with it some of the objectionable taste and odor. However, this method possesses many disadvantages, among them being that the oil becomes less stable when treated in this manner; also the odor and taste of the oil are not improved as much as might be desired. Another method commonly employed for improving the taste and odor of vitamin oils and concentrates involves passing steam through the heated oil or concentrate at a reduced pressure; while this method effects some deodorization, the deodorization is in most cases merely temporary, and, furthermore, this process removes only objectionable constituents of a volatile nature.

It is the object of this invention to provide an improved process for refining and stabilizing fat-soluble vitamin-containing fatty materials having undesirable tastes and odors.

Another object of this invention is to provide an improved process for removing undesirable tastes and odors from fat-soluble vitamin-containing materials objectionable in those respects.

A further object of this invention is to provide refined vitamin-containing fish oils which are relatively stable towards oxidative changes.

Other objects of the invention will in part be obvious and in part appear hereinafter.

I have found that the above and other objects of the invention may be accomplished by heating fat-soluble vitamin-containing fatty materials which it is desired to refine with the fruit of the tomato plant, or with various parts of the fruit, such as the dried pulp thereof or the seeds at a temperature between about 100° C. and 200° C., preferably between about 160° C. and 180° C. These materials are quite remarkable in their refining effects, since by treating fat-soluble vitamin-containing fatty materials in such a manner, any undesirable tastes and odors associated therewith will be substantially completely removed without in any way deleteriously affecting the vitamin potency of the vitamin-containing material. Furthermore, fat-soluble vitamin-containing fatty materials which are so treated are more stable towards deteriorative oxidative changes than are the unrefined materials. In fact it is even possible to enhance the stability of various fatty materials, e. g., fish oils and fish liver oils, merely by mixing them with dried tomato pulp and subsequently removing the pulp by filtration, centrifugation, or other suitable means. Such stabilization treatments are included within the scope of this invention. The term "tomato product" will be used herein to generically connote partially or completely dehydrated tomato fruit and various parts thereof such as the pulp, seeds, skins, etc. which may be used in carrying out the process of the invention.

A fat-soluble vitamin-containing material may be treated in accordance with my invention by mixing the material with a tomato product and heating the mixture at a temperature between about 100° C. and 200° C. in an open vessel; preferably, however, the material is mixed with the tomato product and the mixture heated to the desired temperature in the presence of an inert gas and at a reduced pressure in order to minimize destruction of the vitamins and to assist the removal of odoriferous substances. The preferred embodiment of my invention involves heating a fat-soluble vitamin-containing oil of fish origin having an objectionable taste and odor with dried tomato pulp at temperatures between about 160° C. and 180° C. in an inert gas atmosphere and at a reduced pressure. The refining process of my invention may be combined with other refining processes for improving the character of fat-soluble vitamin-containing materials; thus, for example, such materials may be treated with a tomato product in accordance with my invention and the material then contacted with decolorizing carbon in order to obtain a light colored product. When the refining treatments carried out in accordance with my invention are substantially complete, the fat-soluble vitamin-containing material may be separated from the tomato product and processed as desired. It will be found in every case that the resulting products possess substantially no undesirable tastes or odors, and hence are eminently suitable for practically all purposes, particularly for human consumption. Moreover, the vitamin potencies of the materials refined are not affected by the refining treatment, and the refined materials are more stable towards deteriorative oxidative changes than the untreated materials, thus lessening the likelihood of a future decrease in vitamin potency of the material because of oxidative changes.

Any fat-soluble vitamin-containing material having an undesirable taste and odor may be treated in accordance with my invention; thus materials containing vitamins A, D, E, or K, such as, for example, cod liver oil, halibut liver oil, sword fish liver oil, tuna liver oil, shark liver oil, whale liver oil, porpoise liver oil, seal liver oil, sardine oil, herring oil, salmon oil, and similar oils may be treated, as well as fat-soluble vitamin concentrates obtained, for example, by saponification, vacuum distillation or solvent extraction of a vitamin-containing oil. The process of my invention is particularly applicable to the refining of vitamin A and/or D-containing oils or vitamin D concentrates of fish origin, since treatment of such materials in accordance with my invention produces products far superior to any of those now on the market. The vitamin-containing materials to be treated in accordance with my invention should not contain any foreign metals, since the presence of such metals usually accelerates deterioration of the vitamin A or D content of the oil or concentrate at the elevated temperatures employed.

The tomato product employed in accordance with my invention may be any part of the tomato fruit or the fruit itself. It is preferred to use a tomato product which has had the major portion of its water content removed, e. g., the dried fruit or dried tomato pulp, etc. I prefer to use the dried tomato pulp because of its relative cheapness and ready availability.

In carrying out the process of my invention, a fat-soluble vitamin-containing material having an objectionable taste and odor may be mixed with a suitable amount of tomato product, and the mixture then heated to a temperature between about 100° C. and 200° C., preferably with agitation. The amount of tomato product admixed with the vitamin-containing material may vary widely depending to some extent upon the particular tomato product employed and to some extent upon the taste and odor of the vitamin-containing material to be refined. Generally it may be said that an amount of tomato product varying between about 0.5% and about 20% of the weight of the vitamin-containing material is suitable. The temperature at which the mixture is heated is particularly important, since I have found that at temperatures below about 100° C. the undesirable taste and odor are not substantially completely removed from the fat-soluble vitamin-containing material. I prefer to heat the mixture at a temperature between about 160° C. and about 180° C. since at these temperatures optimum results are obtained. The temperature should preferably not exceed about 200° C., particularly if a vitamin A-containing material is being treated, since deterioration of the vitamin is likely to commence at such temperatures.

The heating may be conducted in an open vessel if desired; however, in order to avoid the danger of deterioration of the vitamin A content of the materials treated in accordance with my invention, the heating step is preferably carried out in the presence of an inert gas such as nitrogen or carbon dioxide. Furthermore, I have found it desirable to heat the mixture at reduced pressures, preferably at pressures below about 200 mm., since under these conditions removal of the odoriferous constituents of the oil or concentrate is accelerated. The time of heating may vary to some extent; generally between about two minutes and about one hour, e. g., between about 5 minutes and about 20 minutes, are sufficient. In some cases it may be found that the process of my invention, while it substantially improves the odor and taste of the fat-soluble vitamin-containing materials, also imparts thereto a color somewhat darker than that possessed by the original material. This color may be easily removed by contacting the refined vitamin-containing material with a decolorizing agent such as decolorizing carbon, whereupon a light colored product substantially free from taste and odor is obtained.

After the fat-soluble vitamin-containing material has been heated with the tomato product in accordance with the process of my invention, the material may be cooled and separated from the tomato product in any suitable manner, e. g., filtration, centrifugation, etc.

The refined products of my invention possess very little, if any, of the objectionable taste and odor characteristic of the materials from which they are obtained; hence these products are eminently suitable for a variety of purposes and find particular use in the preparation of vitamin products for human consumption. Furthermore, extensive tests have indicated that the products of my invention have substantially lower peroxide numbers than those of the original vitamin-containing materials; this factor is of great importance since vitamin-containing materials having low peroxide numbers are much more stable than those having high peroxide numbers. Stability tests run under accelerated conditions have shown conclusively that the refined materials are more stable than the unrefined materials. This may be explained in part by the fact that the tomato products contain certain amounts of natural antioxidants, some of which are apparently incorporated into the vitamin-containing material in carrying out the process of the invention. In fact the stability of fat-soluble vitamin-containing materials may be increased merely by agitating them with tomato products, e. g., dried tomato pulp, without heating. The tomato product is then separated from the vitamin-containing material just as is done in the preferred embodiment of the invention. Such a treatment may be used when there is no need to improve the taste or odor of the fat-soluble vitamin-containing material, but when it is desirable to improve the stability thereof.

For a fuller understanding of the nature and objects of the invention, reference should be had to the following examples which are given merely to further illustrate the invention and are not to be construed in a limiting sense, all parts given being by weight.

*Example I*

45 parts of shark liver oil were mixed with 5 parts of fresh dried tomato pulp. After complete deaeration in the presence of $N_2$ and reduced pressure, the mixture was heated to about 170° C. for 3 minutes. The mixture was then cooled to room temperature and filtered. The treated oil was completely devoid of undesirable tastes and odors, and the vitamin potency was unchanged.

A sample of the original oil and a sample of the treated oil were tested for stability by maintaining them under accelerated conditions of destruction, i. e., at 34.5° C. in the presence of air, and then measuring the percentage of vitamin A destroyed with the following results:

| Sample | Vitamin A destruction after— | | |
|---|---|---|---|
| | 6 days | 14 days | 20 days |
| Original oil | Per cent 12.3 | Per cent 37.1 | Per cent 70.3 |
| Treated oil | 1.9 | 12.8 | 19.0 |

Example II 100 parts of partially refined fish liver oil containing 100,000 U. S. P. units per gram and possessing a characteristic fishy odor and taste were thoroughly mixed with 20 parts of finely ground dried tomato pulp, and the mixture heated to 150° C. for 5 minutes under a reduced pressure of about 10 mm. The mixture was then cooled to room temperature and filtered. The treated oil was completely devoid of fishiness and the vitamin potency was practically unchanged. Stability tests conducted as in Example I gave the following results:

| Sample | Vitamin A destruction after— | | |
|---|---|---|---|
| | 6 days | 14 days | 20 days |
| Original oil | Per cent 18.0 | Per cent 44.6 | Per cent 78.0 |
| Treated oil | 3.8 | 22.4 | 32.0 |

Example III 200 parts of shark liver oil containing 60,000 U. S. P. units of vitamin A per gram and possessing a strong fishy odor and taste were mixed with 30 parts of freshly comminuted tomato seeds and the mixture thoroughly mixed in an inert atmosphere for 30 minutes, after which the mixture was filtered. The resulting oil was bland in taste and odor and brilliantly clear, and the vitamin potency was unchanged. Stability tests carried out as in Example I gave the following results:

| Sample | Vitamin A destruction after— | | | |
|---|---|---|---|---|
| | 6 days | 14 days | 20 days | 27 days |
| Original oil | Per cent 8.3 | Per cent 21.0 | Per cent 38.7 | Per cent 65.8 |
| Treated oil | 2.7 | 7.5 | 12.8 | 21.0 |

It can readily be seen from the above description and examples that by the use of the process of my invention, fat-soluble vitamin-containing materials may be easily and efficiently refined and stabilized.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with a tomato product and heating the mixture at a temperature between 100° C. and 200° C. under reduced pressure for a period of time sufficient to remove the objectionable tastes and odors from said vitamin-containing material.

2. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with a tomato product and heating the mixture at a temperature between 160° C. and 180° C. under reduced pressure for a period of time sufficient to remove the objectionable tastes and odors from said vitamin-containing material.

3. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with a tomato product and heating the mixture at a temperature between 100° C. and 200° C. under reduced pressure in an inert gas atmosphere for a period of time sufficient to remove the objectionable tastes and odors from said vitamin-containing material.

4. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with a tomato product and heating the mixture at a temperature between 160° C. and 180° C. under reduced pressure in an inert gas atmosphere for a period of time sufficient to remove the objectionable tastes and odors from said vitamin-containing material.

5. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with dried tomato pulp and heating the mixture at a temperature between 100° C. and 200° C. under reduced pressure for a period of time sufficient to remove the objectionable tastes and odors from said vitamin-containing material.

6. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with dried tomato pulp and heating the mixture at a temperature between 160° C. and 180° C.

under reduced pressure for a period of time sufficient to remove the objectionable tastes and odors from said vitamin-containing material.

7. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with dried tomato pulp and heating the mixture at a temperature between 100° C. and 200° C. under reduced pressure in an inert gas atmosphere for a period of time sufficient to remove the objectionable tastes and odors from said vitamin-containing material.

8. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with dried tomato pulp and heating the mixture at a temperature between 160° C. and 180° C. under reduced pressure in an inert gas atmosphere for a period of time sufficient to remove the objectionable tastes and odors from said vitamin-containing material.

LORAN O. BUXTON.

CERTIFICATE OF CORRECTION.

Patent No. 2,347,462.  April 25, 1944.

LORAN O. BUXTON.

It is hereby certified that error appears in the printed specification of the above numbered patent requiring correction as follows: Page 2, second column, line 10, for "200 mm." read --20 mm.--; and that the said Letters Patent should be read with this correction therein that the same may conform to the record of the case in the Patent Office.

Signed and sealed this 20th day of June, A. D. 1944.

(Seal)

Leslie Frazer
Acting Commissioner of Patents.